(12) United States Patent
Hadley et al.

(10) Patent No.: US 11,945,534 B2
(45) Date of Patent: Apr. 2, 2024

(54) POWERED UNICYCLE WITH HANDLE

(71) Applicant: RAZOR USA LLC, Cerritos, CA (US)

(72) Inventors: Robert Hadley, Yorba Linda, CA (US); William Griggs, Cerritos, CA (US); Ian Desberg, Cerritos, CA (US)

(73) Assignee: Razor USA LLC, Cerritos, CA (US)

( * ) Notice: Subject to any disclaimer, the term of this patent is extended or adjusted under 35 U.S.C. 154(b) by 0 days.

(21) Appl. No.: 16/234,946

(22) Filed: Dec. 28, 2018

(65) Prior Publication Data

US 2019/0241228 A1 Aug. 8, 2019

Related U.S. Application Data

(63) Continuation of application No. 15/962,349, filed on Apr. 25, 2018, now abandoned, which is a
(Continued)

(51) Int. Cl.
*B62K 1/00* (2006.01)
*B62K 3/00* (2006.01)
(Continued)

(52) U.S. Cl.
CPC .............. *B62K 1/00* (2013.01); *B62K 3/002* (2013.01); *B62K 5/02* (2013.01); *B62K 11/007* (2016.11);
(Continued)

(58) Field of Classification Search
CPC . B62K 1/00; B62K 3/002; B62K 5/00; B62K 5/02; B62K 2005/001; B62K 11/007
See application file for complete search history.

(56) References Cited

U.S. PATENT DOCUMENTS 619,816 A  2/1899  Wise
979,572 A  12/1910  Sayer
(Continued)

FOREIGN PATENT DOCUMENTS

CN  103191558 A  7/2013
CN  103707972     4/2014
(Continued)

OTHER PUBLICATIONS

PCT Search Report for international application No. PCT/US2015/067490 dated Mar. 18, 2016.
(Continued)

*Primary Examiner* — Anne Marie M Boehler
(74) *Attorney, Agent, or Firm* — Knobbe, Martens, Olson & Bear, LLP

(57) ABSTRACT

Various powered unicycles are disclosed. In some embodiments, the powered unicycle includes a central wheel, a motor to power the central wheel, and a control system configured to control the application of power from the motor to the central wheel. The unicycle comprises a body portion and at least one platform for supporting the user. The unicycle can includes a handle that extends upwardly to a position that it can be grasped by a user of the unicycle. The handle can be partially or fully retractable into the body of the unicycle. In some configurations, two platforms upon which the user can stand are provided with one on each side of the central wheel. In some configurations, a pair of auxiliary or outrigger wheels is provided, such as with one outrigger wheel on each side of the central wheel.

21 Claims, 21 Drawing Sheets

Related U.S. Application Data continuation of application No. 14/978,067, filed on Dec. 22, 2015, now abandoned.

(60) Provisional application No. 62/096,465, filed on Dec. 23, 2014.

(51) Int. Cl.
*B62K 5/00* (2013.01)
*B62K 5/02* (2013.01)
*B62K 11/00* (2006.01)
*B62K 25/00* (2006.01)

(52) U.S. Cl.
CPC ........ *B62K 25/00* (2013.01); *B62K 2005/001* (2013.01); *B62K 2204/00* (2013.01)

(56) References Cited

U.S. PATENT DOCUMENTS

| | | |
|---|---|---|
| 2,450,979 A | 10/1948 | Wilhelm |
| 2,793,877 A | 5/1957 | Meier, Jr. |
| 2,950,127 A | 8/1960 | Phillips |
| 3,399,742 A | 9/1968 | Malick |
| 3,695,626 A | 10/1972 | Kenneth, Jr. |
| 3,895,794 A | 7/1975 | England |
| 4,109,741 A | 8/1978 | Gabriel |
| D261,022 S | 9/1981 | Hoskins |
| 4,513,837 A | 4/1985 | Archer |
| 4,657,272 A | 4/1987 | Davenport |
| D289,985 S | 5/1987 | Davenport |
| 4,691,798 A | 9/1987 | Engelbach |
| 4,786,069 A | 11/1988 | Tang |
| 4,863,182 A | 9/1989 | Chern |
| 5,100,163 A | 3/1992 | Egley et al. |
| 5,167,597 A | 12/1992 | David |
| 5,326,118 A | 7/1994 | Derosa |
| 5,352,403 A | 10/1994 | Egley |
| 5,454,579 A | 10/1995 | Chen |
| 5,492,354 A | 2/1996 | Rainey |
| 5,868,413 A | 2/1999 | Cabrera |
| 6,113,122 A | 9/2000 | Plana |
| 6,561,294 B1 | 5/2003 | Kamen et al. |
| 7,000,930 B2 | 2/2006 | Smith |
| 7,537,229 B1 | 5/2009 | Wu |
| 7,543,834 B2 | 6/2009 | Coczey |
| 7,641,213 B1 | 1/2010 | Chen |
| 7,798,510 B2 | 9/2010 | Comstock et al. |
| D626,892 S | 11/2010 | Shin |
| 7,963,352 B2 | 6/2011 | Alexander |
| 8,381,847 B2 | 2/2013 | Polutnik |
| 8,417,404 B2 | 4/2013 | Yen et al. |
| 8,523,212 B2 | 9/2013 | Ryan et al. |
| 8,616,313 B2 | 12/2013 | Simeray et al. |
| 8,800,697 B2 | 8/2014 | Hoffman et al. |
| 8,998,232 B2 | 4/2015 | Chen |
| 9,085,334 B2 | 7/2015 | Hoffman et al. |
| 9,114,843 B2 | 8/2015 | Ryan et al. |
| 9,174,692 B2 | 11/2015 | Treadway et al. |
| 9,211,932 B1 | 12/2015 | Huennekens et al. |
| 9,475,532 B2 | 10/2016 | Di Vitto |
| 9,481,423 B2 | 11/2016 | Chen |
| 9,493,047 B2 | 11/2016 | Gong et al. |
| 9,533,727 B2 | 1/2017 | Chen |
| 9,611,004 B2 | 4/2017 | Hoffmann et al. |
| 9,731,783 B2 | 8/2017 | Artemev |
| 9,919,762 B2 | 3/2018 | Kim et al. |
| 10,076,954 B2 | 9/2018 | Burtov et al. |
| 10,207,763 B2 | 2/2019 | Artemev |
| 2002/0063006 A1 | 5/2002 | Kamen et al. |
| 2005/0134019 A1 | 6/2005 | Plana |
| 2005/0139406 A1 | 6/2005 | Mcleese |
| 2005/0241864 A1 | 11/2005 | Hiramatsu |
| 2006/0131830 A1 | 6/2006 | Berg |
| 2008/0105471 A1 | 5/2008 | Kamen et al. |
| 2009/0085320 A1 | 4/2009 | Fraser |
| 2009/0155033 A1 | 6/2009 | Olsen et al. |
| 2011/0191013 A1 | 8/2011 | Leeser |
| 2011/0209932 A1 | 9/2011 | Takenaka et al. |
| 2011/0220427 A1 | 9/2011 | Chen |
| 2011/0304117 A1 | 12/2011 | Aloni |
| 2013/0228385 A1 | 9/2013 | Chen |
| 2014/0326525 A1 | 11/2014 | Doerksen |
| 2015/0107922 A1 | 4/2015 | Bigler |
| 2015/0175233 A1 | 6/2015 | Ungar |
| 2016/0031515 A1 | 2/2016 | Andreev |
| 2016/0136508 A1 | 5/2016 | Bigler |
| 2016/0137258 A1 | 5/2016 | Alvarez et al. |
| 2016/0185411 A1 | 6/2016 | Hadley et al. |
| 2016/0185417 A1 | 6/2016 | Tang |
| 2016/0339328 A1 | 11/2016 | Simeray et al. |
| 2017/0008594 A1 | 1/2017 | Artemev |
| 2018/0265159 A1 | 9/2018 | Artemev |
| 2018/0354575 A1 | 12/2018 | Hadley et al. |

FOREIGN PATENT DOCUMENTS

| | | |
|---|---|---|
| CN | 103707973 | 4/2014 |
| CN | 203740021 | 7/2014 |
| CN | 203832655 | 9/2014 |
| CN | 104229016 A | 12/2014 |
| CN | 107207065 | 9/2017 |
| EP | 2 362 842 B1 | 5/2012 |
| EP | 2 409 905 B1 | 10/2014 |
| JP | 6381813 B2 | 8/2018 |
| KR | 20-0374726 Y1 | 2/2005 |
| PH | 2014000435 | 8/2014 |
| WO | WO 2012/160400 A1 | 11/2012 |
| WO | WO 2015/010634 A1 | 1/2015 |
| WO | WO 2015/118310 A1 | 8/2015 |
| WO | WO 2016/106372 A1 | 6/2016 |

OTHER PUBLICATIONS

International Preliminary Report on Patentability for International Patent Application No. PCT/US2015/067490, dated Jul. 6, 2017, in 7 pages.

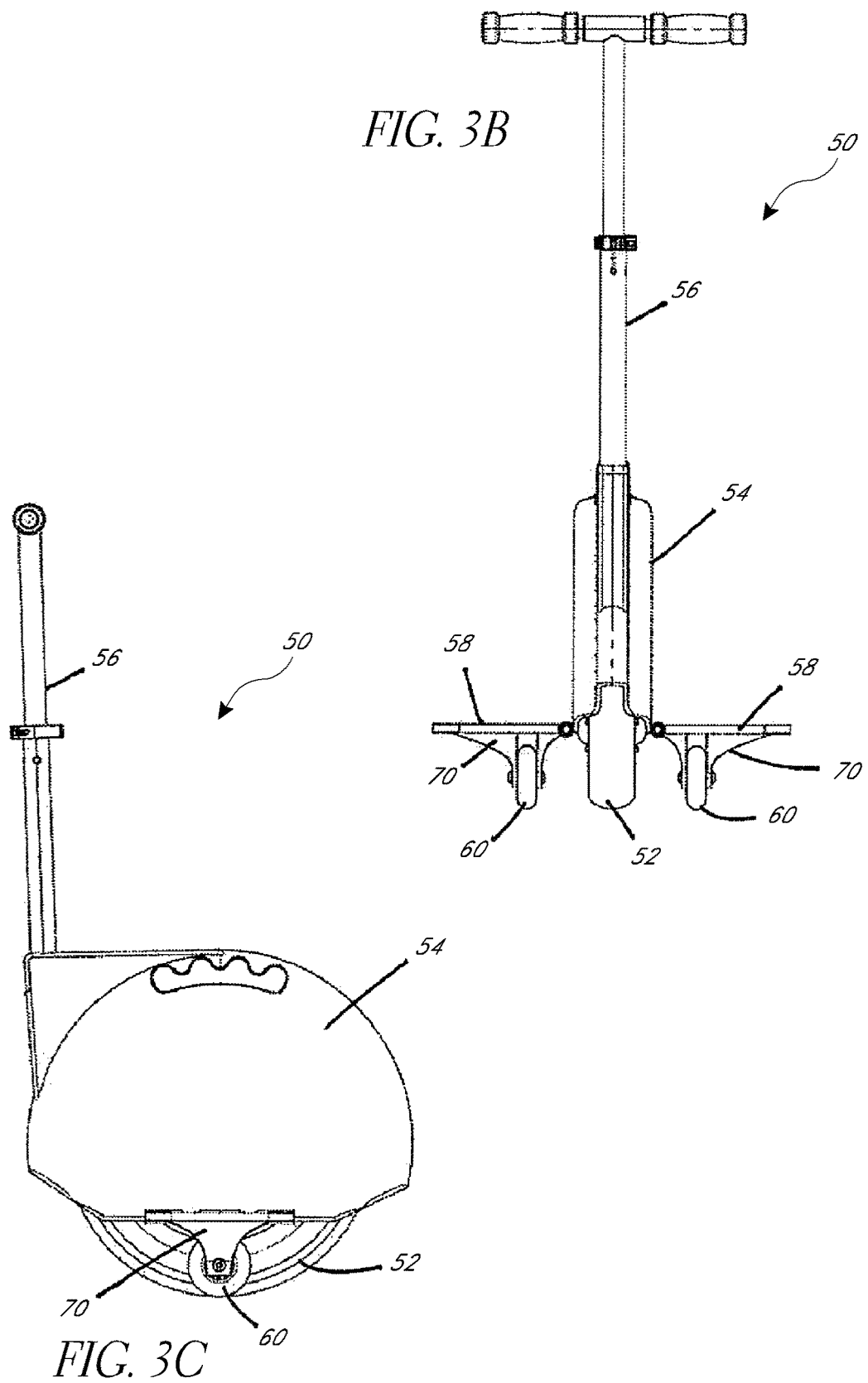

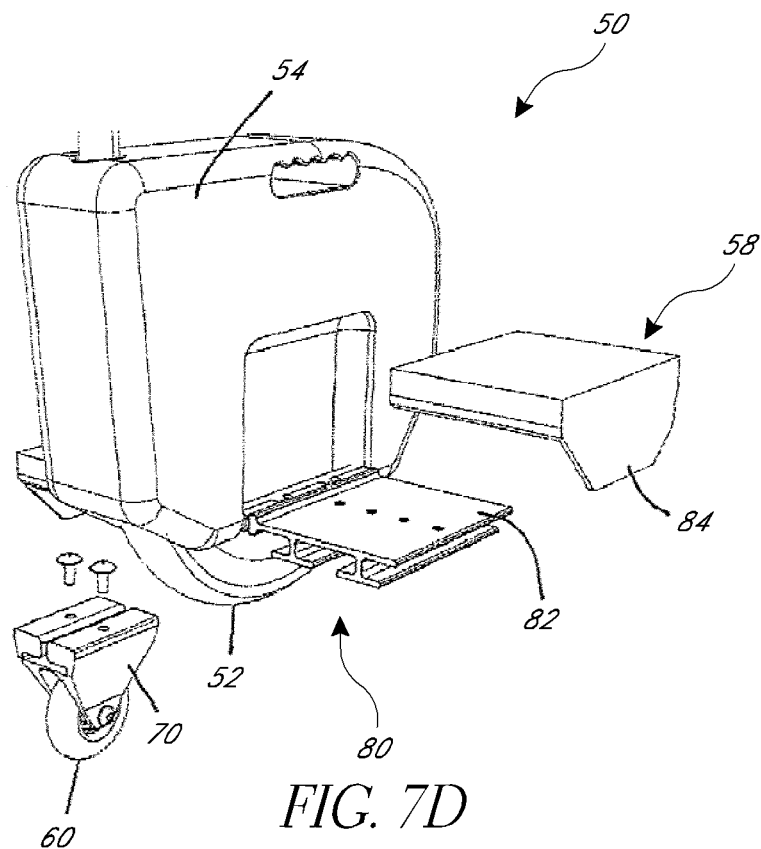
FIG. 7D
FIG. 7E
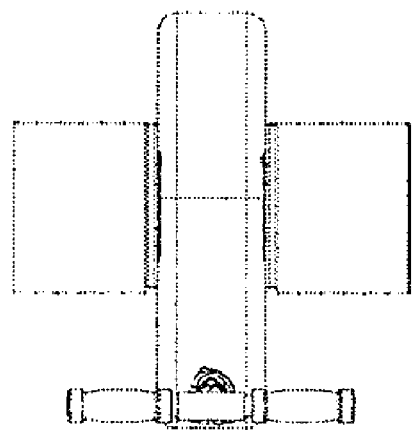

POWERED UNICYCLE WITH HANDLE

CROSS REFERENCE

This application is a continuation of U.S. patent application Ser. No. 15/962,349, filed Apr. 25, 2018, which is a continuation of U.S. patent application Ser. No. 14/978,067, filed Dec. 22, 2015, which claims the priority benefit under 35 U.S.C. § 119 of U.S. Patent Application No. 62/096,465, filed Dec. 23, 2014, the entirety of each of which are hereby incorporated by reference. Additionally, any applications for which a foreign or domestic priority claim is identified in the Application Data Sheet as filed with the present application are hereby incorporated by reference in their entirety.

BACKGROUND

Field

The present disclosure relates to powered vehicles. In particular, the present disclosure relates to a powered unicycle having a handle.

Description of the Related Art

Powered vehicles, including powered unicycles, exist in the prior art. However, a need exists for improved vehicles to address one or more shortcomings of the existing design or at least to provide the consumer with a meaningful choice.

SUMMARY

The systems, methods and devices described herein have innovative aspects, no single one of which is indispensable or solely responsible for their desirable attributes. Without limiting the scope of the claims, some of the advantageous features will now be summarized.

In some configurations, a powered unicycle includes a central wheel, a motor to power the central wheel and a control system configured to control the application of power from the motor to the central wheel. The unicycle comprises a body portion and at least one platform for supporting the user. Preferably, the unicycle includes a handle that extends upwardly to a position that it can be grasped by a user of the unicycle.

In some configurations, the handle can be partially or fully retractable into the body of the unicycle.

In some configurations, two platforms upon which the user can stand are provided with one on each side of the central wheel.

In some configurations, a pair of auxiliary or outrigger wheels is provided, with one on each side of the central wheel.

In some configurations, the pair of outrigger wheels is centered with respect to the central wheel in a fore-aft direction of the unicycle.

In some configurations, each of the outrigger wheels is coupled to one of the platforms.

In some configurations, a suspension element or arrangement is positioned between the body and the outrigger wheels.

In some configurations, the suspension element is between a swingarm for the outrigger wheel and the platform.

In some configurations, the mounts for the outrigger wheels are integrated or unitary with the platforms.

In some configurations, the platforms can pivot relative to the body.

In some configurations, a portion of the platforms can pivot relative to the body. The pivoting portion can be positioned outboard of the outrigger wheel.

In some configurations, a position of the outrigger wheels can be adjusted.

In some configurations, the lateral position of the outrigger wheels is adjustable. The platform and the outrigger wheel assembly can comprise a flange and slot arrangement, which allows the lateral position of the outrigger wheel to be adjusted between at least two available positions.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

FIG. 3B is a front view of the embodiment of FIG. 3A.

FIG. 3C is a side view of the embodiment of FIG. 3A

FIG. 7D is a detailed view of the platform of the embodiment of FIG. 7A.

FIG. 7E is a top view of the embodiment of FIG. 7A.

DETAILED DESCRIPTION

Figure 1A:
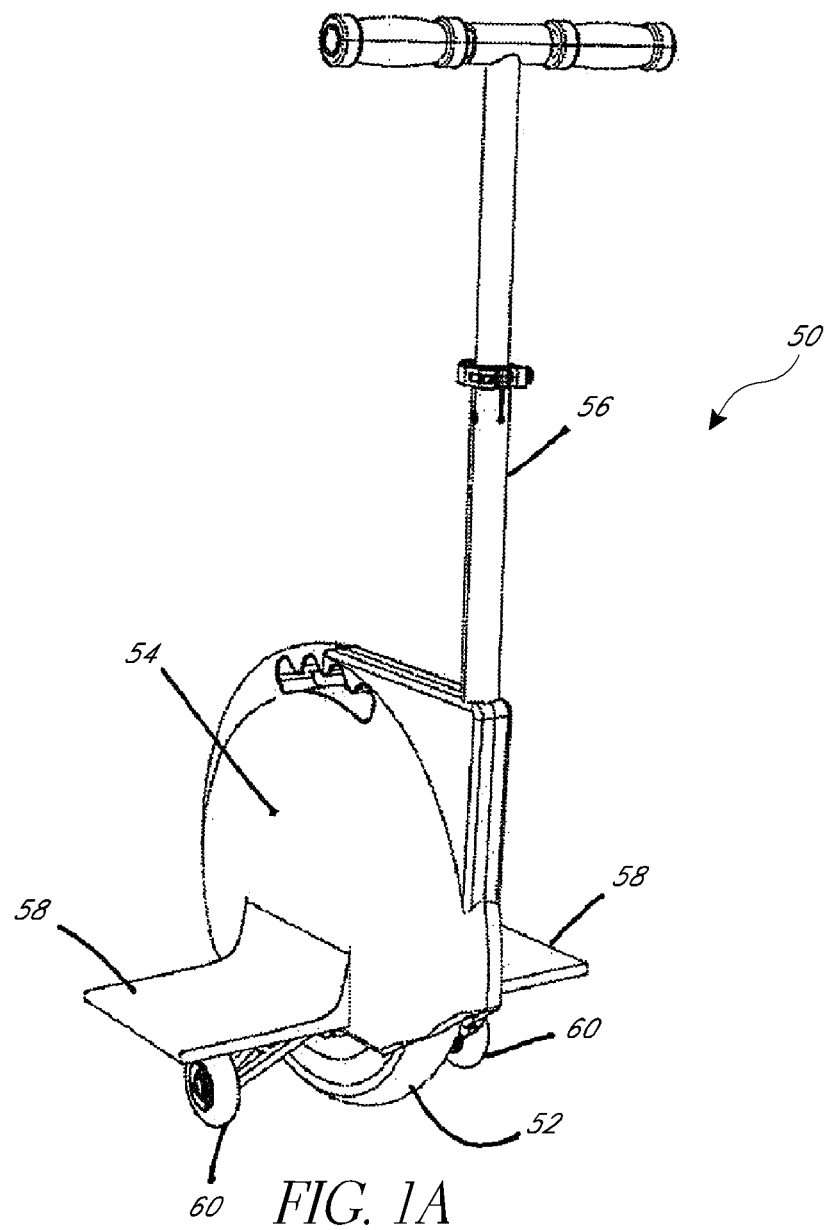
FIG. 1A is a perspective view of an embodiment of a powered unicycle.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1A-7E illustrate several embodiments of a powered unicycle. Features from the various embodiments can be combined as desired to form many combinations apart from those explicitly shown. Unless otherwise indicated, the basic arrangement of the powered unicycles can be in accordance with the arrangements disclosed in U.S. Pat. No. 8,807,250 entitled POWERED SINGLE-WHEELED SELF-BALANCING VEHICLE FOR STANDING USER. In particular, at least some configurations incorporate a control system as described in the '250 Patent. In addition, the general arrangement of the drive motor, power source (e.g., battery), drive between the motor and central wheel, and other basic features can be the same as or similar to those of the '250 Patent or of another suitable arrangement. Accordingly, the entirety of the '250 Patent, and all documents referenced in it (including but not limited to U.S. Pat. No. 6,302,230), are hereby incorporated by reference herein and made a part of the present disclosure.

FIG. 1A illustrates a vehicle, such as a powered unicycle 50, having a powered, central wheel 52, a body 54 and a handle 56 extending upwardly from the body 54. At least one platform is provided to support a user. In the illustrated arrangement, a platform 58 is provided on each side of the central wheel 52. A user of the unicycle 50 can stand on the platforms 58 with one foot on each platform 58 such that the user is straddling the central wheel 52. In some configurations, the platforms are positioned below an axis of rotation of the central wheel 52. A height of the handle 56 can be adjusted relative to the platforms 58, such as by a selectively-locking, telescopic arrangement. The handle 56 can be in the form of a T-handle having a handlebar portion at its upper end. In some configurations (as described below with reference to FIG. 5), the handle 56 can be stowed within the body 54 to make the unicycle 50 easier to store or carry.

Figure 1B:
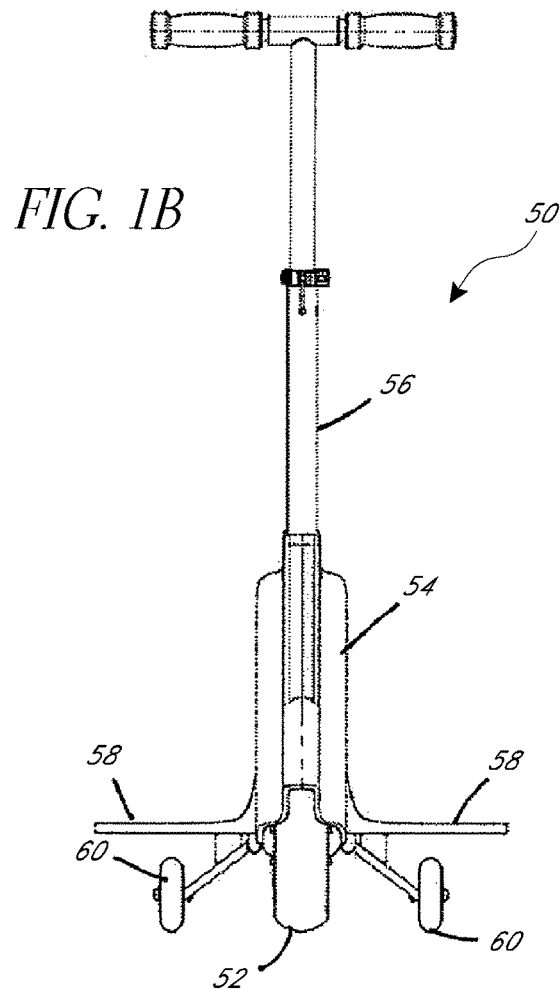
FIG. 1B is a front view of the embodiment of FIG. 1A.
Figure 1C:
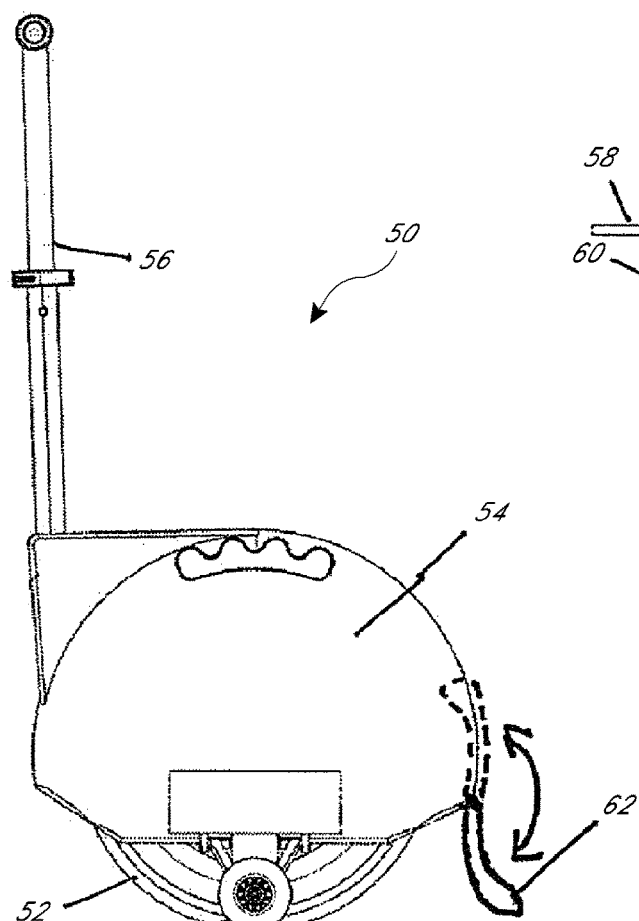
FIG. 1C is a side view of the embodiment of FIG. 1A

FIG. 1B is a front view of the embodiment shown in FIG. 1A. In some configurations, a pair of auxiliary or outrigger wheels 60 is provided, with one outrigger wheel 60 positioned on each side of the central wheel 52. FIG. 1C is a side view of the embodiment shown in FIGS. 1A and 1B. Each of the outrigger wheels 60 preferably is centered with respect to the central wheel 52 in a fore-aft direction of the unicycle 50 such that lowermost points of the three wheels 52, 60, 60 define a line extending in a lateral direction of the unicycle 50. Thus, in such configurations, the unicycle 50 may be dynamically stable but unstable when not powered on or while stationary. Accordingly, an optional kickstand 62 (shown in FIG. 1D) can be provided to allow the unicycle 50 to be conveniently parked in a relatively upright position. The kickstand 62 can fold up when not in use and can clip onto or within the body 54 in the stored position.

In outrigger wheel 60 may have a diameter that is smaller than the diameter of the central wheel 52. In the illustrated embodiment, the ratio between the diameter of the outrigger wheel 60 and the diameter of the central wheel 52 is about 0.2. In other embodiments, this ratio is at least about: 0.1, 0.3, 0.5, 0.9, values between the aforementioned values, and otherwise. In some embodiments, the unicycle 50 can have a first and second outrigger wheel 60, with the first outrigger wheel 60 having a diameter that is different from the diameter of a second outrigger wheel 60. In some variants, the unicycle 50 can have a first and a second outrigger wheel 60 with the diameter of the first outrigger wheel 60 being the same as the diameter of the second outrigger wheel 60.

In at least some configurations, the lowermost points of the outrigger wheels 60 are raised or elevated relative to the central wheel 52 such that only one of the outrigger wheels 60, along with the central wheel 52, touches a flat surface upon which the unicycle 50 rests at any point in time. However, in some configurations, all three wheels can touch a flat surface upon which the unicycle 50 rests at any point in time.

The central wheel 52 can be driven by means known in the art such as a friction drive mechanism. For example, the unicycle 50 can include a motor that is attached to a frame housed within the central wheel 52. The motor can cause the central wheel 52 to spin around the frame. The frame can include one or more guide wheels that contact an inner rim of the central wheel 52 and keep the frame secured within the central wheel 52. For example, the inner rim of the central wheel 52 can fit into a gap between a pair of guide wheels that share an axis of rotation. The guide wheels can therefore be in contact with the inner rim of the central wheel 52 and can spin along with the central wheel 52, holding the central wheel 52 in place by way of the inner rim.

The motor can be adapted to directly drive a drive wheel that is coupled to the frame and is positioned at the lowermost point along the inner rim of the central wheel 52 Like the guide wheels, the drive wheel can be in contact with the inner rim of the central wheel 52. By way of its contact with the inner rim of the central wheel 52, the drive wheel can transmit torque from motor to the central wheel 52, thereby causing the central wheel to spin about the frame to which the motor is mounted. Since this drive system operates by friction, the drive wheel and the inner rim of the central wheel 52 must be pressed together with enough force to prevent slippage. With the drive wheel positioned at the lowermost point along the inner rim of the central wheel 52, the weight of the user can provide the needed force.

The motor drives the central wheel 52 by applying a torque, which in turn creates a reaction torque on the unicycle 50. Since the torque acts about the axle of the central wheel 52, the reaction torque corresponds to a force acting at the center of gravity of the system, including the vehicle and payload. The rotating central wheel 52 also generates a rolling friction force at the point of contact of the central wheel 52. The rolling friction force is proportional to the velocity of the central wheel 52. In order for the unicycle to be stable, the net forces on the center of gravity must balance. Thus the unicycle 50 can include a control unit known in the art that adjusts the rotational velocity of the central wheel 52 according to the lean of the center of gravity relative to the axis of rotation of the central wheel 52.

Figure 1D:
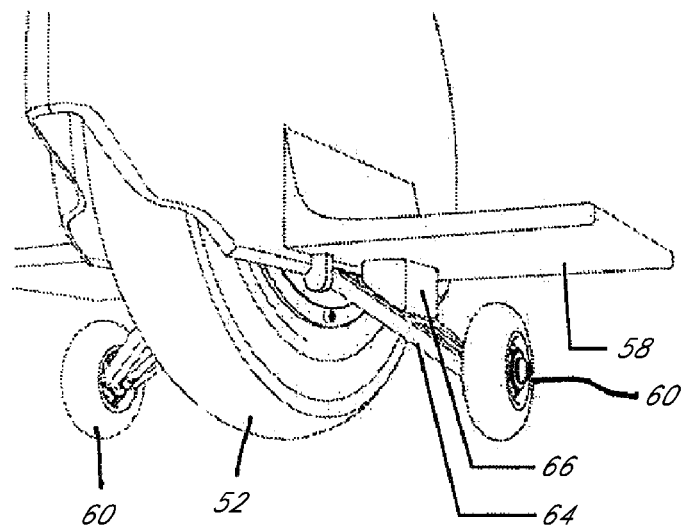
FIG. 1D is a detailed view of the outrigger wheel of the embodiment of FIG. 1A.
Figure 1E:
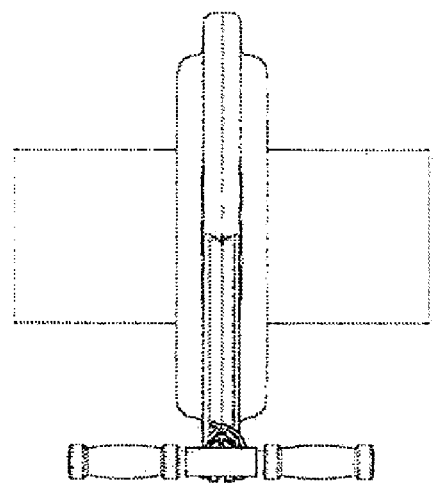
FIG. 1E is a top view of the embodiment of FIG. 1A.

FIG. 1D is an upward-angled view of the outrigger wheel 60 of the embodiment of the unicycle 50 depicted in FIG. 1A. In some configurations, the unicycle 50 incorporates suspension between the outrigger wheels 60 and another portion of the unicycle 50, such as the body 54 or platforms 58, such that movement of the outrigger wheels 60 is permitted and is controlled by the suspension. The suspension can be of any suitable arrangement and can provide one or both of a spring force and a damping force. In the illustrated arrangement, the outrigger wheels 60 are carried by a wheel support member, such as a swing arm 64, that is movable (pivotal) relative to the body 54 and/or platform 58. A suspension element, such as elastomer 66, can apply a resilient force to the swing arm 64. In the illustrated arrangement, the elastomer 66 is positioned between the platform 58 and the swing arm 64 and applies a force tending to move the outrigger wheel 60 downward or away from the platform 58. The elastomer 66 can also apply a damping force in response to movement of the outrigger wheel 60 due to, for example, internal friction of the elastomer material. Other suitable suspension arrangements can also be used, such as air or mechanical springs and oil dampers, for example. FIG. 1 E is a top view of the embodiment shown in FIG. 1A.

Figure 2A:
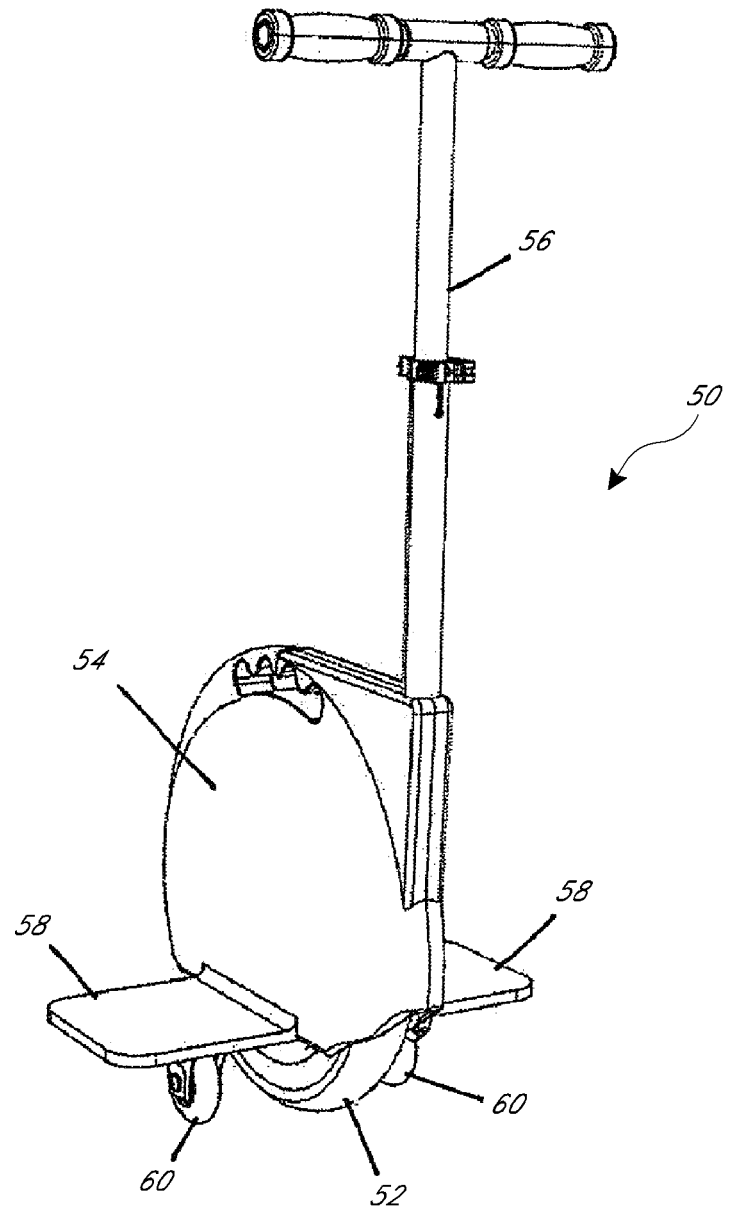
FIG. 2A is a perspective view of an embodiment of a powered unicycle.

FIG. 2A illustrates an alternative powered unicycle 50. In the arrangement of FIG. 2, the outrigger wheels 60 are held in a fixed position relative to the platforms 58. In particular, the outrigger wheels 60 can be coupled to the underneath side of the platforms 58 by wheel mounts 70. The wheel mounts 70 can be integrated or unitarily formed with the platforms 58. In the illustrated arrangement, each of the wheel mounts 70 includes two mount portions on each side of the outrigger wheel 60. In other arrangements, the outrigger wheel 60 could be supported by a wheel mount portion on one side of the wheel 60.

Figures 2B, 2C:
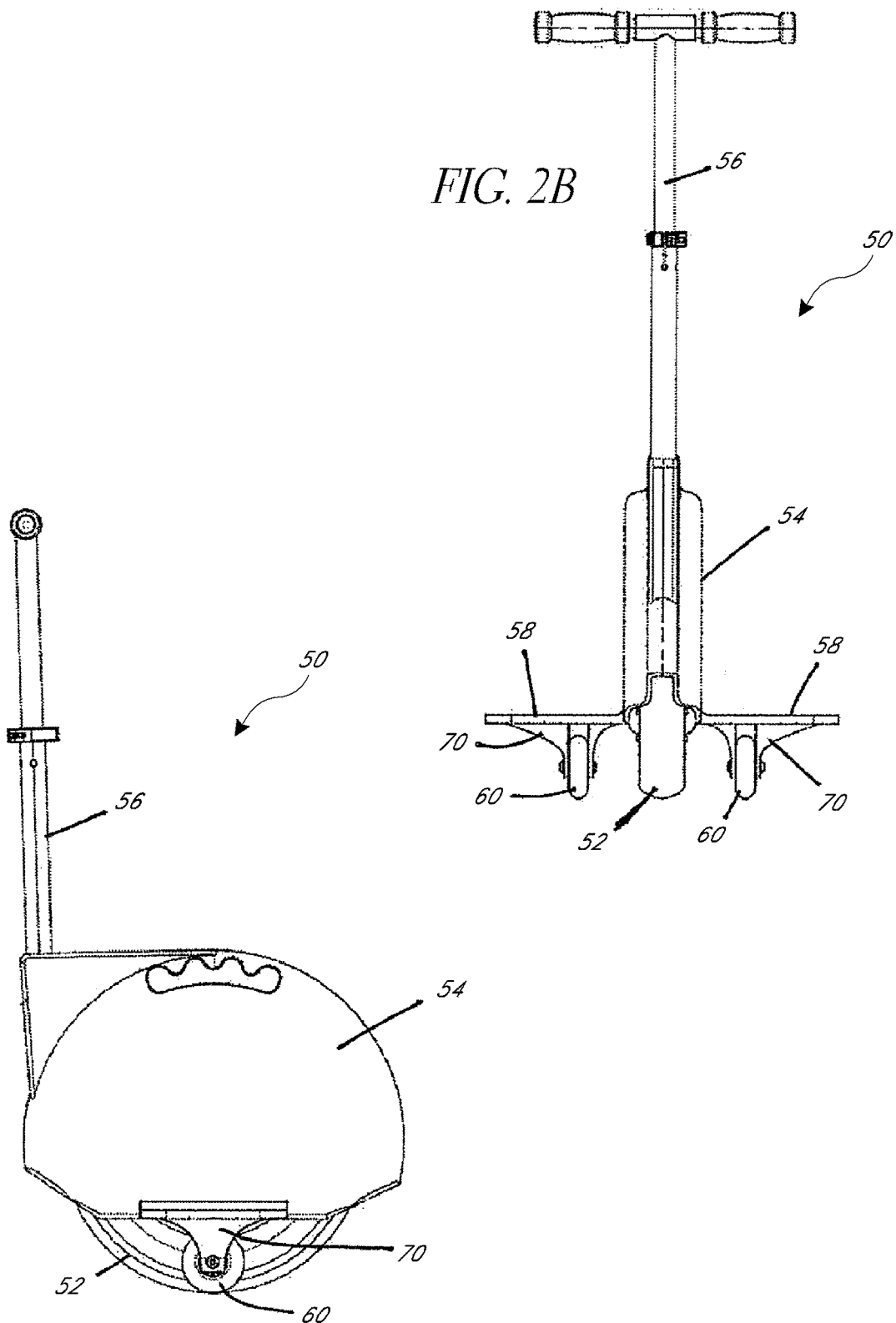
FIG. 2B is a front view of the embodiment of FIG. 2A.
FIG. 2C is a side view of the embodiment of FIG. 2A

FIG. 2B is a front view of the illustrative embodiment shown in FIG. 2A. The outrigger wheel 60 can be positioned at any desirable lateral position relative to the central wheel 52. For example, in the illustrated arrangement, the outrigger wheel 60 is located on an inboard half of the associated platform 58. In other arrangements, the outrigger wheel 60 can be located at other locations relative to the central wheel 52, such as at the center of the platform 58 or on the outboard half of the platform 58. In the illustrated embodiment, the ratio between the lateral distance of the outrigger wheel 60 from the medial plane of the central wheel and the diameter of the central wheel 52 is about 0.36. In other embodiments, this ratio is at least about: 0.2, 0.4, 0.6, 0.8, values between the aforementioned values, and otherwise. In some embodiments, the unicycle 50 can include a first and a second outrigger wheel 60, with the first outrigger wheel 60 having a lateral distance from the central wheel 52 that is different from the lateral distance of the second outrigger wheel 60 from the central wheel 52. In some variants, the unicycle 50 can include first and second outrigger wheels 60 that have the same lateral distance from the central wheel 52, as illustrated in FIG. 2B.

Figure 2D:
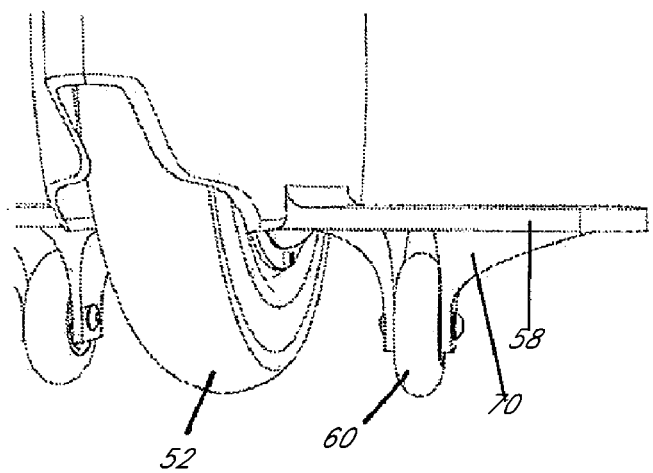
FIG. 2D is a detailed view of the outrigger wheel of the embodiment of FIG. 2A.
Figure 2E:
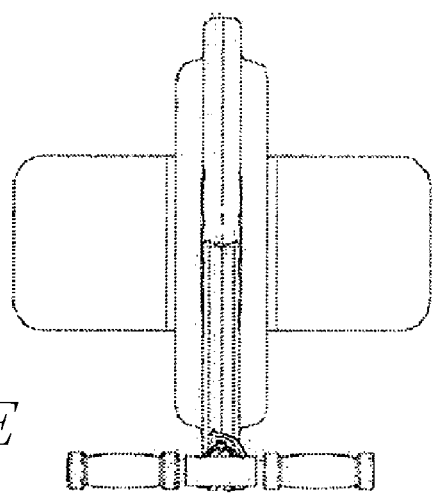
FIG. 2E is a top view of the embodiment of FIG. 2A.

FIG. 2C is a side view of the embodiment shown in FIG. 2A and 2B, illustrating the handle 56 can be stored inside the body 54 of the unicycle 50, as noted in the drawing. In some variants, the handle does not store in the body 54 of the unicycle 50. FIG. 2D is an angled frontal view of the embodiment shown in FIG. 2A-2C, illustrating that the platforms 58 can be integrated with the outrigger wheels 60, as noted in the drawing. FIG. 2E is a top view of the embodiment shown in FIG. 2A.

Figure 3A:
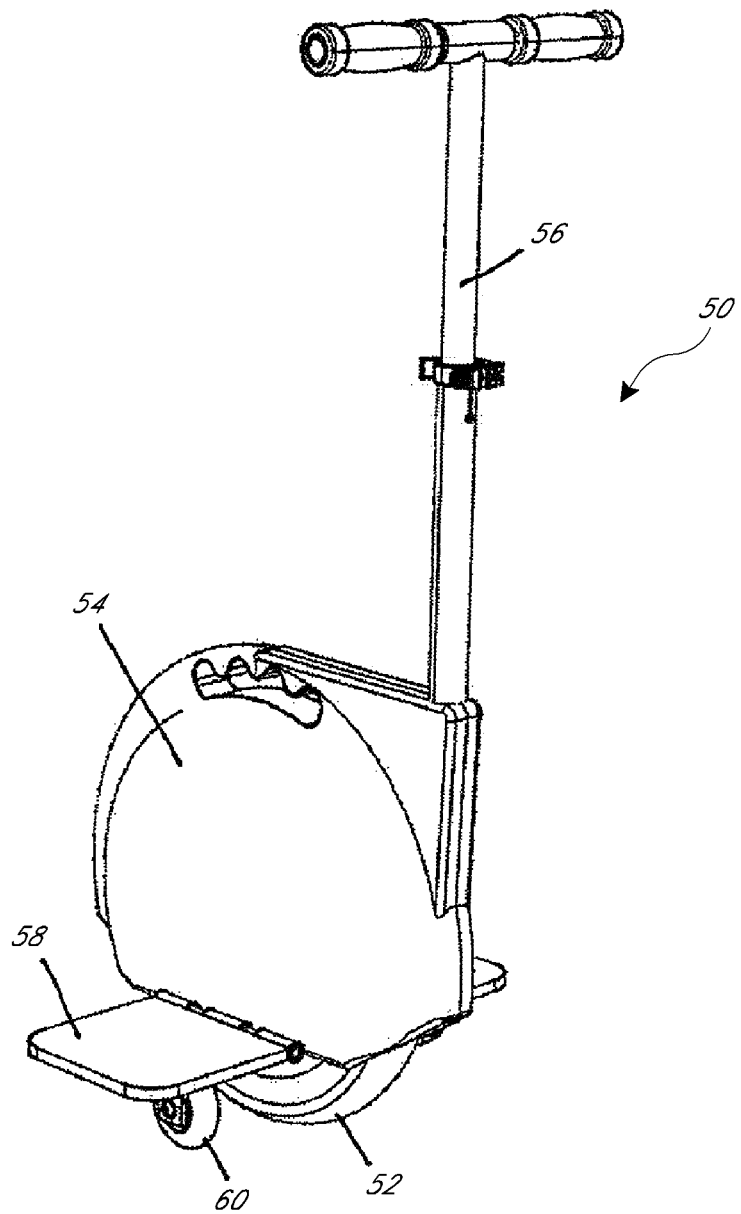
FIG. 3A is a perspective view of an embodiment of a powered unicycle.

FIG. 3A illustrates another alternative powered unicycle 50 in which at least a portion or an entirety of each of the platforms 58 is foldable or pivotal relative to the body 54. For example, a pivot assembly 72 can be provided that is configured to allow a portion or an entirety of the platform 58 to fold or pivot relative to the body 54. FIG. 3B is a front view of the embodiment shown in FIG. 3A. In the illustrated arrangement, the pivot assembly 72 is located adjacent the body 54 such that an entirety or a substantial entirety of the platform 58 can be folded up and toward or against the body 54. In the illustrated arrangement, the outrigger wheel 60 and mount 70 move with the platform 58; however, in other arrangements, the platform 58 could move separately from the outrigger wheels 60, which could be stationary or separately foldable.

The illustrated pivot axis of the pivot assembly 72 is oriented in a fore-aft direction of the unicycle 50 and/or is generally horizontal or parallel and/or coincident with an upper surface of the platform 58. However, in other arrangements, the axis of the pivot assembly 72 could be oriented in other directions.

Figure 3D:
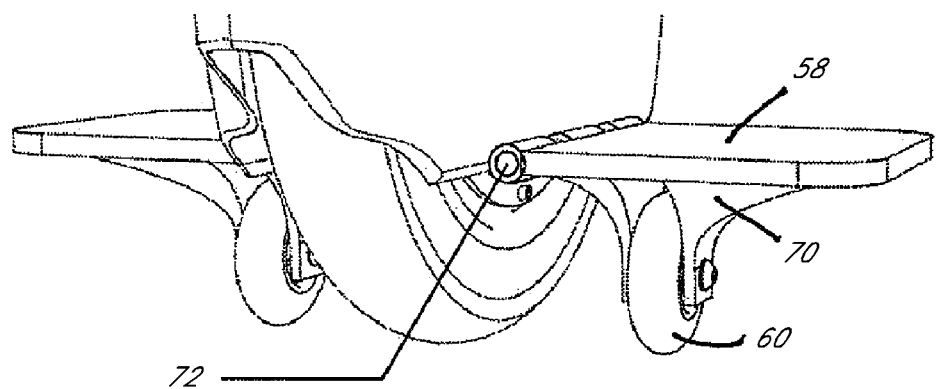
FIG. 3D is a detailed view of the outrigger wheel of the embodiment of FIG. 3A.
Figure 3E:
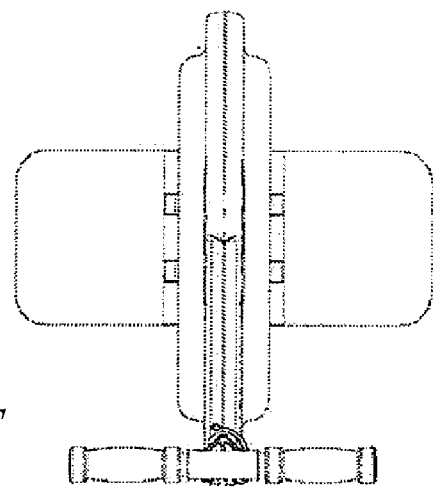
FIG. 3E is a top view of the embodiment of FIG. 3A.

FIG. 3C is a side view of the embodiment shown in FIG. 3A and 3B, illustrating the handle 56 can be stored inside the body 54 of the unicycle 50, as noted in the drawing. In some variants, the handle does not store in the body 54 of the unicycle 50. FIG. 3D is an angled frontal view of the embodiment shown in FIG. 3A-3C, illustrating that the hinged platforms 58 can be integrated with the outrigger wheels 60, as noted in the drawing. FIG. 3E is a top view of the embodiment shown in FIG. 3A.

Figure 4A:
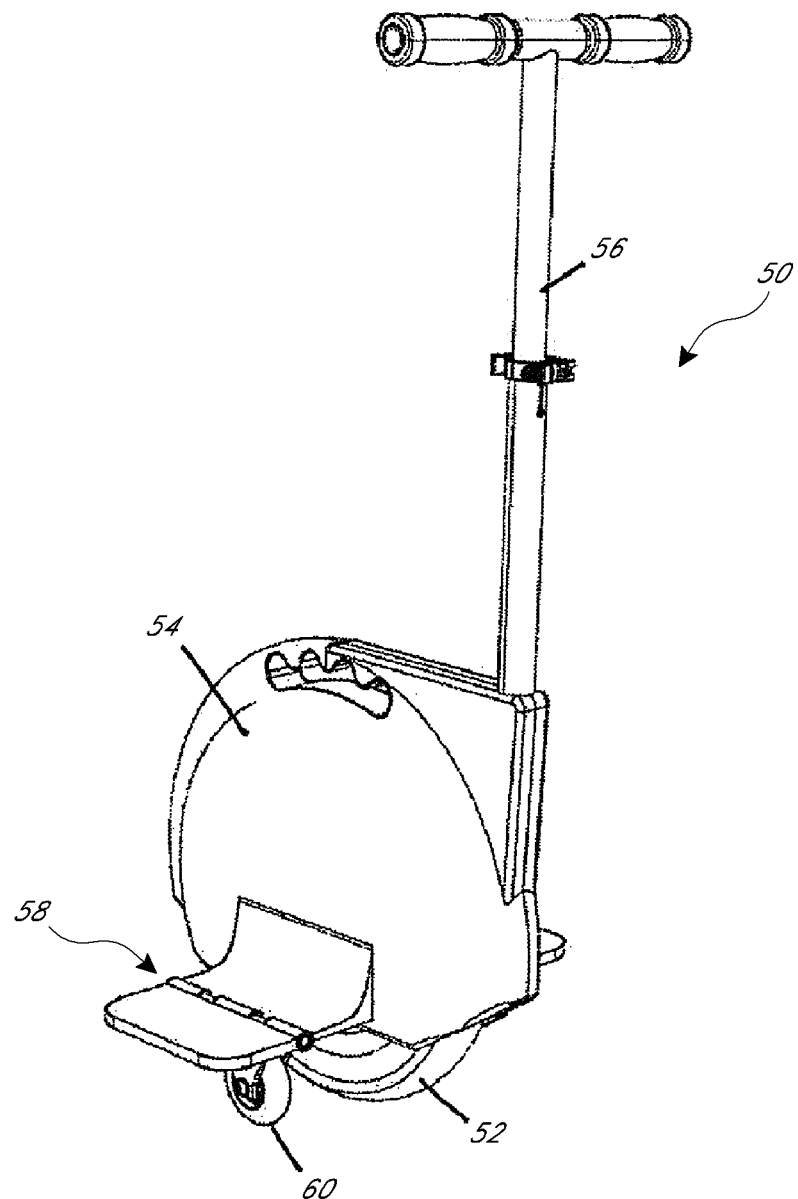
FIG. 4A is a perspective view of an embodiment of a powered unicycle.
Figure 4B:
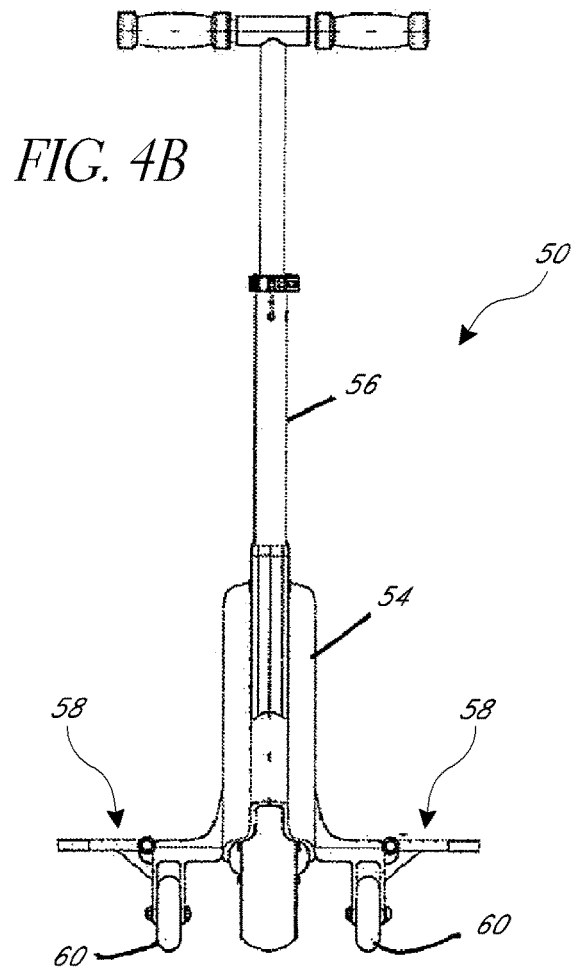
FIG. 4B is a front view of the embodiment of FIG. 4A.

FIG. 4A illustrates a powered unicycle 50 in which a portion of the platforms 58 can pivot relative to the body 54. FIG. 4B is a front view of the embodiment depicted in FIG. 4A. In the illustrated arrangement, the pivoting portion is positioned outboard of the outrigger wheel 60 and/or the wheel mount 70. In the illustrated arrangement, the ratio between the lateral width of the non-pivoting part of the platform 58 and the lateral width of the pivoting part of the platform 58 is about 0.85. In other embodiments, this ratio is at least about: 0.6, 0.9, 1.1, 1.3, values between the aforementioned values, and otherwise. In other arrangements, the pivot assembly 72 can be positioned inboard of the outrigger wheel 60 and/or wheel mount 70. In some such configurations, the outrigger wheel 60 and/or wheel mount 70 can fold with the foldable portion of the platform 58.

Figure 4C:
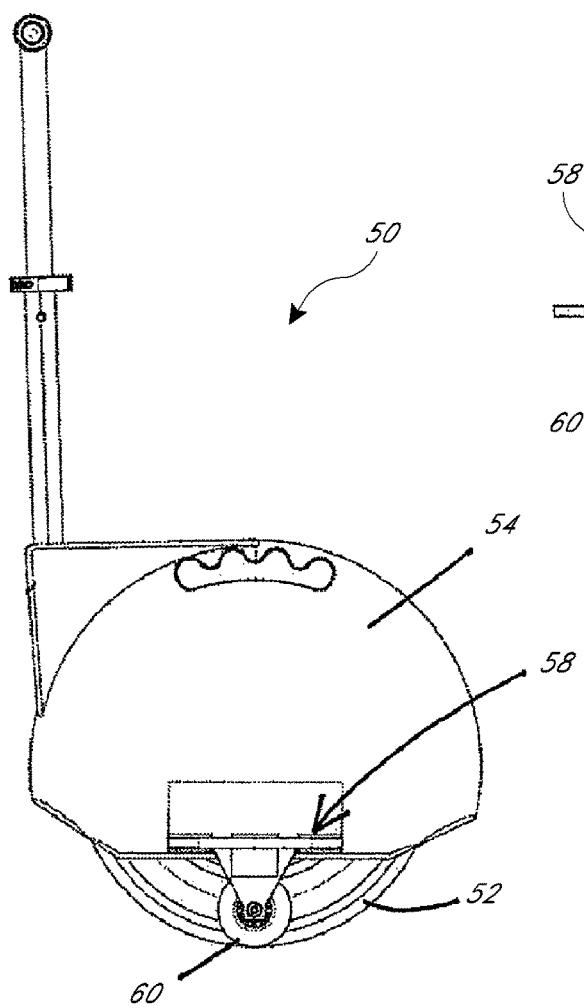
FIG. 4C is a side view of the embodiment of FIG. 4A
Figure 4D:
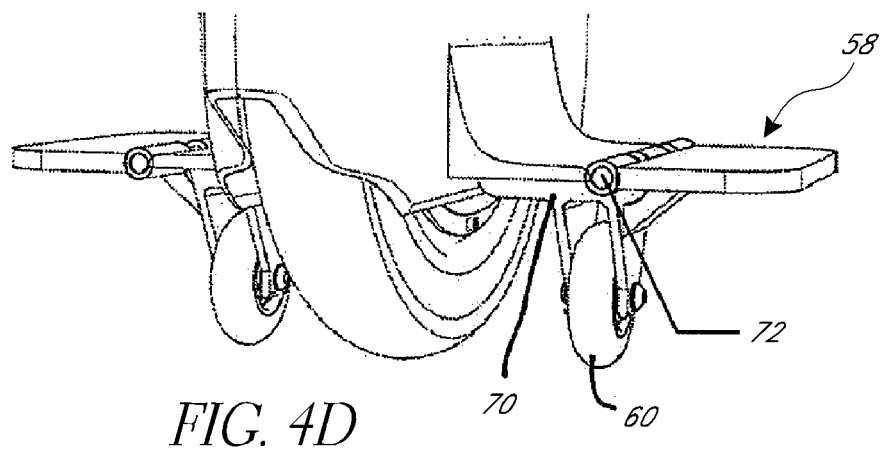
FIG. 4D is a detailed view of the outrigger wheel of the embodiment of FIG. 4A.
Figure 4E:
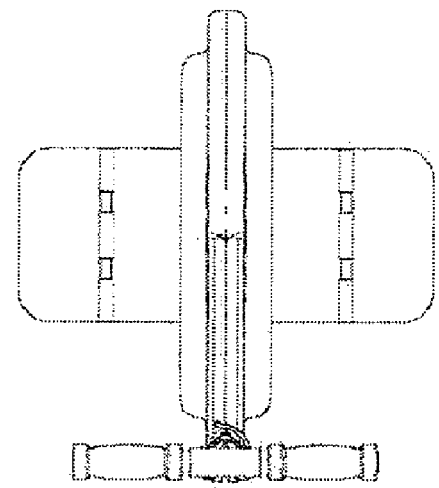
FIG. 4E is a top view of the embodiment of FIG. 4A.

FIG. 4C is a side view of the embodiment shown in FIG. 4A and 4B, illustrating the handle 56 can be stored inside the body 54 of the unicycle 50, as noted in the drawing. In some variants, the handle does not store in the body 54 of the unicycle 50. FIG. 4D is an angled frontal view of the embodiment shown in FIG. 4A-4C, illustrating that the platforms 58 can be integrated with the outrigger wheels 60 outside of the hinge point, as noted in the drawing. FIG. 4E is a top view of the embodiment shown in FIG. 4A.

Figure 5A:
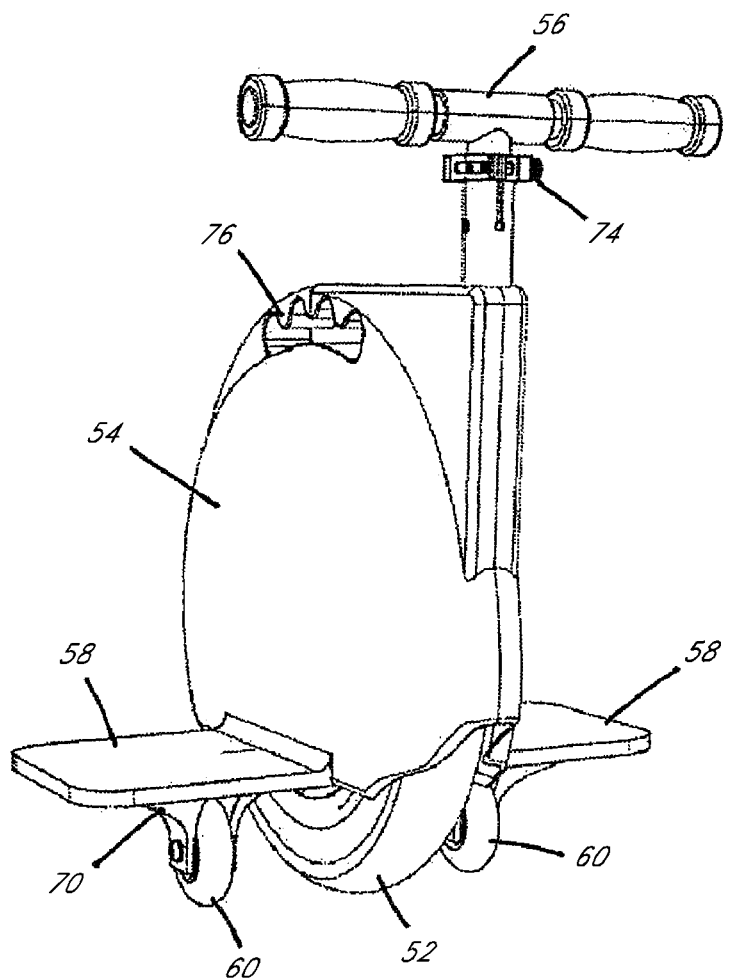
FIG. 5A is a perspective view of an embodiment of a powered unicycle.

FIG. 5A illustrates a powered unicycle 50 in which the handle 56 is stowable partially or substantially completely within a housing of the body 54. For example, the handle 56 can comprise two, three or more sections or portions that are telescopically coupled to move between and extended position and a retracted position. A lock 74 can be provided between one or more, or each, of the pairs of telescoping sections to selectively secure the handle 56 in a desired position. In some configurations, the handle 56 can be secured in positions intermediate the extended and retracted positions to allow a user to customize the height of the handle 56. In some configurations, the handle 56 is infinitely adjustable between the extended position and the retracted position, or between two other positions.

The body 54 of the unicycle 50 can also include a carrying handle arrangement to allow the unicycle 50 to be lifted or carried. In the illustrated arrangement, the carrying handle arrangement comprises a recess or through hole 76 in a housing of the body 54. The recess or through hole 76 can be positioned at or near an upper end of the body 56 and at or near a midpoint in a lengthwise direction of the unicycle 50. The recess or through hole 76 can be positioned directly above a center of gravity of the unicycle 50, which may or may not coincide with a lengthwise midpoint.

Figure 5B:
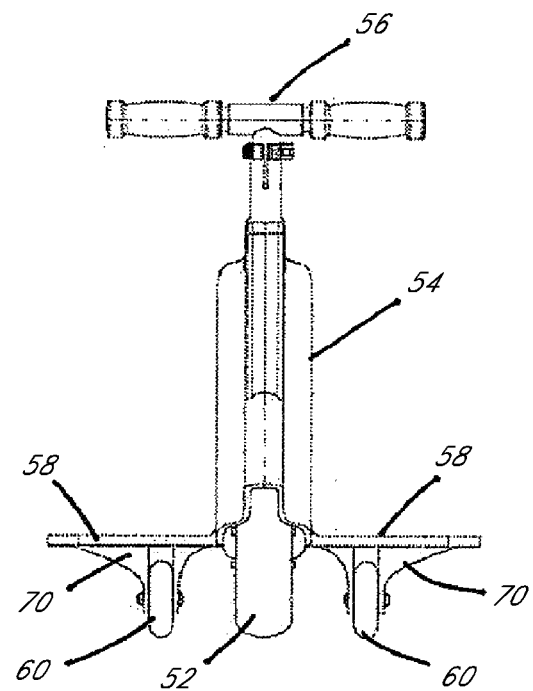
FIG. 5B is a front view of the embodiment of FIG. 5A.
Figure 5C:
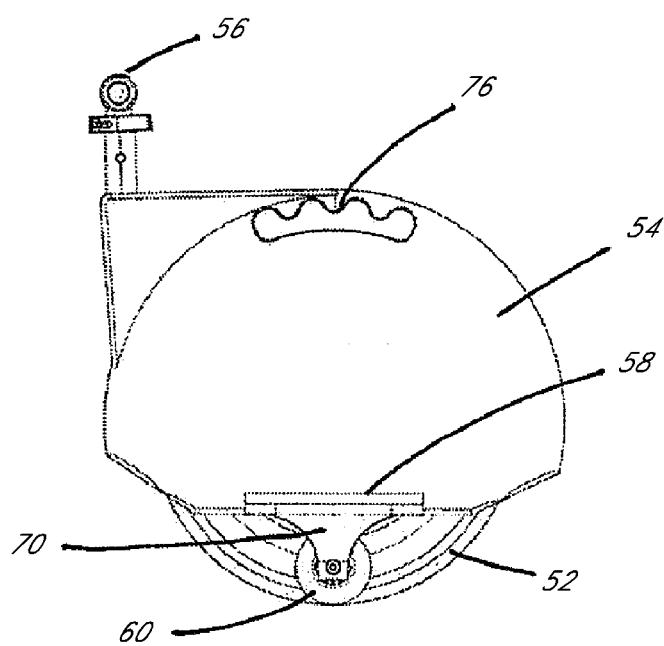
FIG. 5C is a side view of the embodiment of FIG. 5A
Figure 5D:
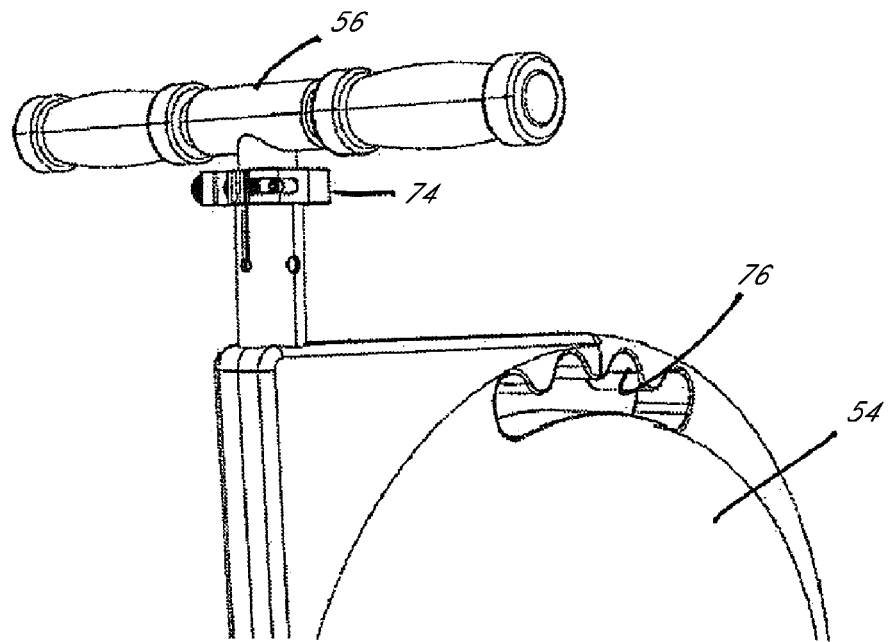
FIG. 5D is a detailed view of the handle of the embodiment of FIG. 5A.
Figure 5E:
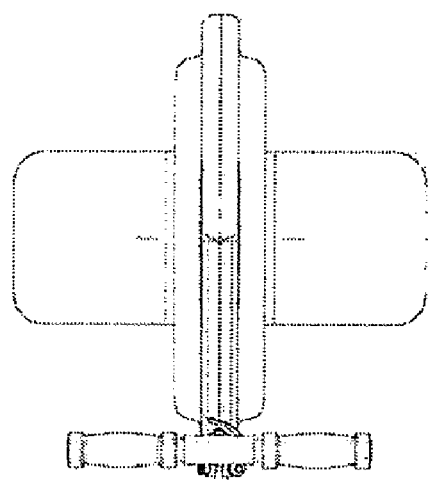
FIG. 5E is a top view of the embodiment of FIG. 5A.

FIG. 5B is a front view of the embodiment shown in FIG. 5A. FIG. 5C is a side view of the embodiments shown in FIG. 5A and 5B. FIG. 5D is a partial side view embodiments depicted in FIGS. 5A-5C, showing the handle in its stowed position. FIG. 5E is a top view of the embodiment shown in FIG. 5A.

FIGS. 6A-7E illustrate unicycles 50 in which a position of the outrigger wheels 60 can be adjusted. In some configurations, one or both of a lateral and fore-aft position of the outrigger wheels 60 can be adjusted. The adjustments can be discrete or infinitely adjustable.

Figure 6A:
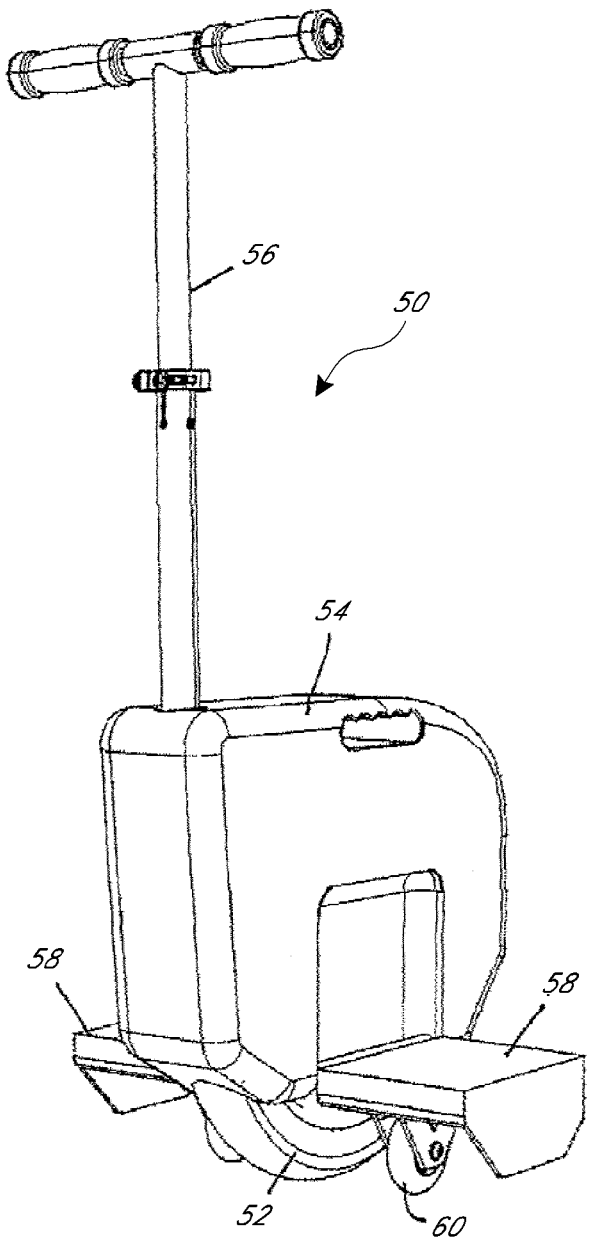
FIG. 6A is a perspective view of an embodiment of a powered unicycle.
Figure 6B:
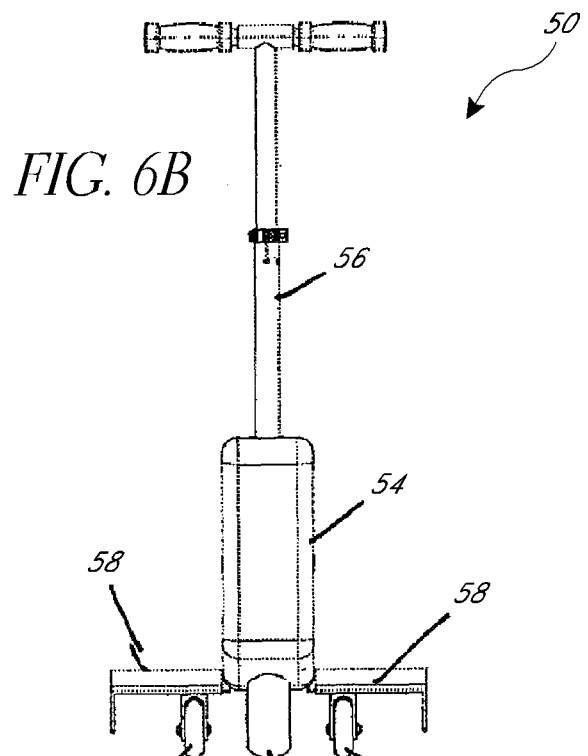
FIG. 6B is a front view of the embodiment of FIG. 6A.
Figure 6C:
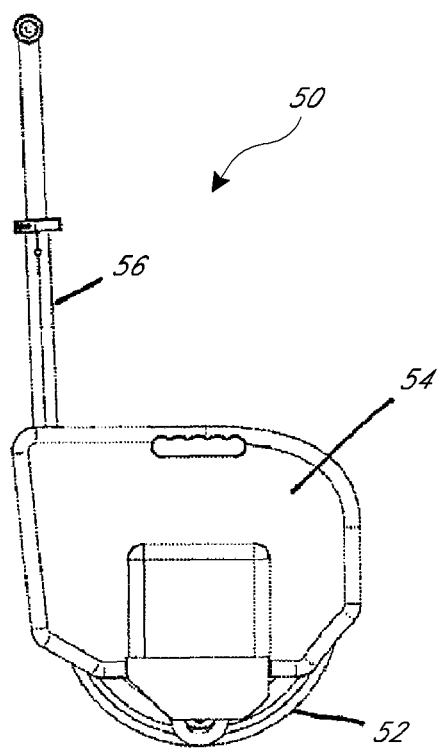
FIG. 6C is a side view of the embodiment of FIG. 6A
Figure 6D:
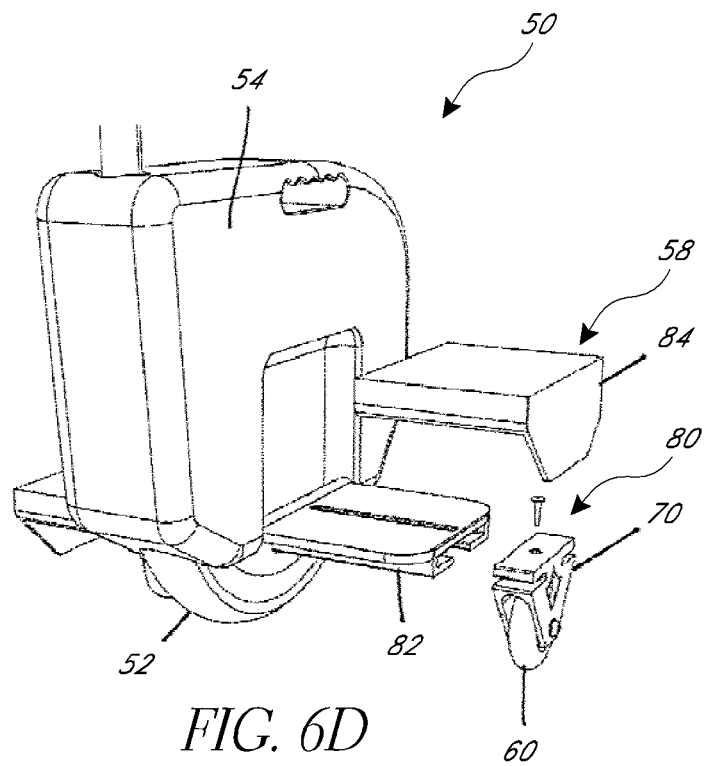
FIG. 6D is a detailed view of the platform of the embodiment of FIG. 6A.
Figure 6E:
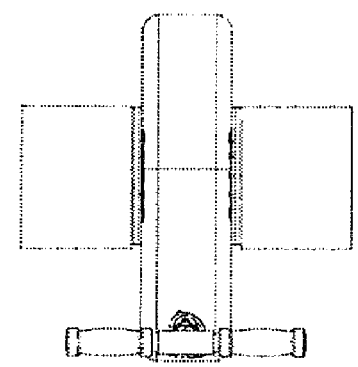
FIG. 6E is a top view of the embodiment of FIG. 6A.

In FIG. 6A, the unicycle 50 includes an outrigger wheel adjustment arrangement 80 comprising a slot-and-flange arrangement. FIG. 6B is a front view of the embodiment shown in FIG. 6A. FIG. 6C is a side view of the embodiment shown in FIGS. 6A and 6B. FIG. 6D is an assembly view of the embodiment shown in FIGS. 6A-6C, illustrating how the wheel assembly slides into a single channel platform, as noted in the drawing. However, other suitable adjustment arrangements could be used. The illustrated adjustment arrangement 80 comprises a platform base 82 defining a slot and the wheel mount 70 defines a flange that is received within the slot. However, this arrangement could be reversed. The wheel mount 70 can be moved along the slot to a desired location and secured in place, such as via a fastener, as illustrated. In the illustrated arrangement, a lateral position of the wheel mount 70 can be adjusted. A cover 84 can be positioned over the base 82 and form an upper surface of the platform 58. Alternatively, the platform 58 could be separate from the wheel adjustment arrangement 80. Both platforms 58 and wheel mounts 70 can be of the same construction. FIG. 6E is a top view of the embodiment shown in FIGS. 6A-6D.

Figure 7A:
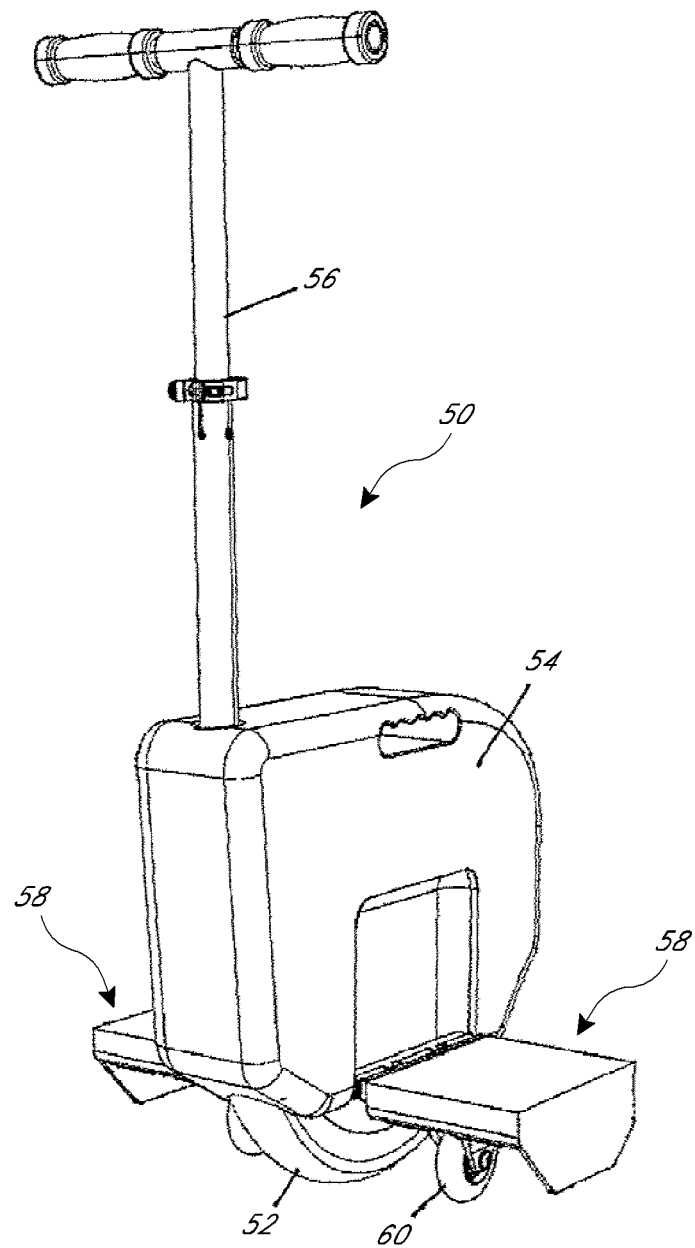
FIG. 7A is a perspective view of an embodiment of a powered unicycle.
Figures 7B, 7C:
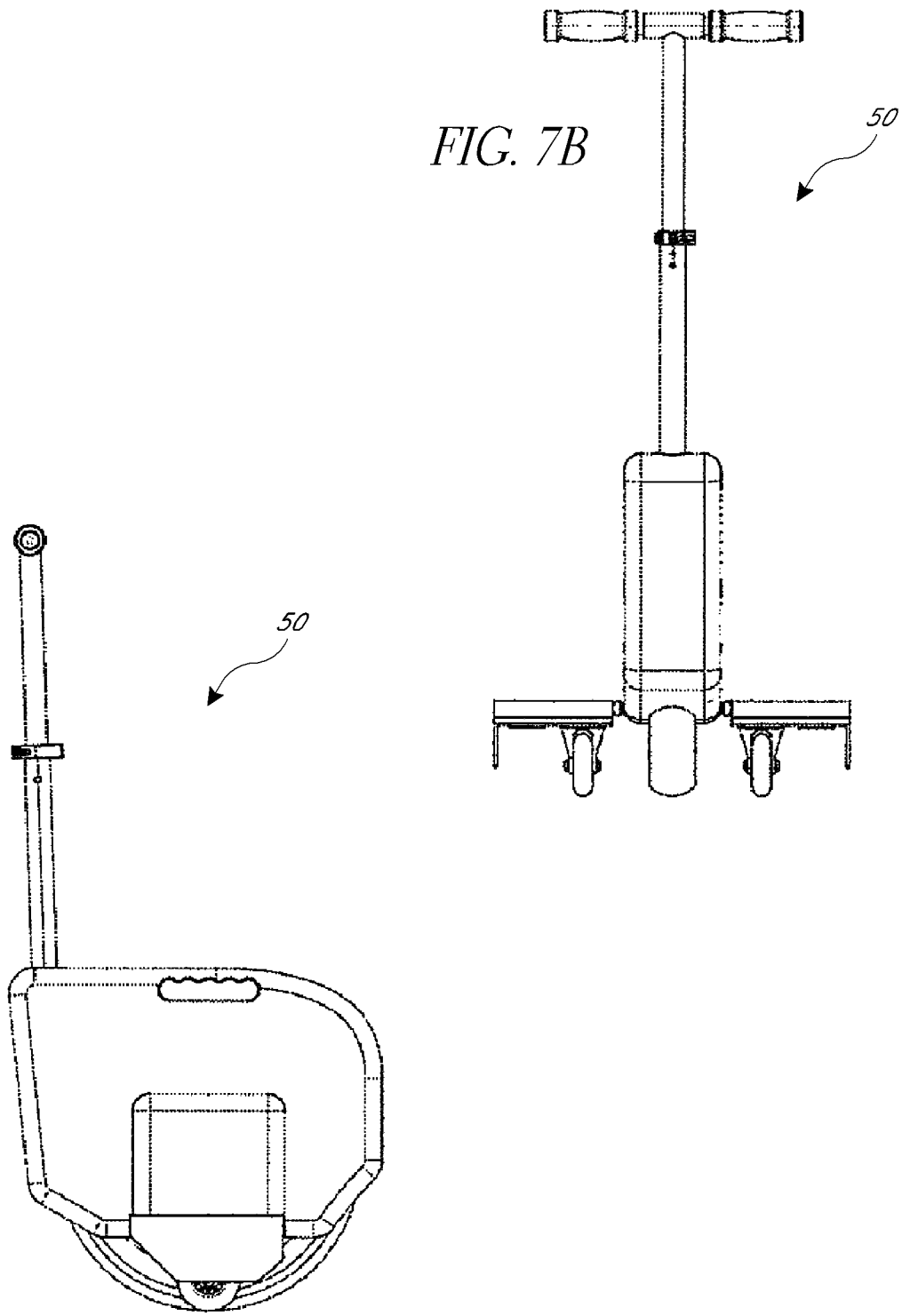
FIG. 7B is a front view of the embodiment of FIG. 7A.
FIG. 7C is a side view of the embodiment of FIG. 7A

FIG. 7A illustrates an arrangement in which the lateral adjustment of the outrigger wheel 60 is between a number (e.g., two) of discrete positions. FIG. 7B is a front view of the embodiment shown in FIG. 7A. FIG. 7C is a side view of the embodiment shown in FIGS. 7A and 7B. FIG. 7D is an assembly view of the embodiment shown in FIGS. 7A-7C, illustrating how the wheel assembly slides into a double channel platform, as noted in the drawing. As shown in FIG. 7D, the base 82 comprises a number (e.g., two) of laterally-spaced flanges and the wheel mount 70 comprises a slot that receives the flange. However, this arrangement could be reversed. The wheel mount 70 can be positioned on a desired one of the flanges of the base 82 and secured in position by a suitable arrangement, such as the illustrated fasteners. If multiple fastener openings were provided in a fore-aft direction, the illustrated arrangement could also allow for fore-aft adjustment of the outrigger wheels 60. The arrangement of FIG. 7D also includes a cover 84 for the base 82. FIG. 7E is a top view of the embodiment shown in FIGS. 7A-7D.

Certain Terminology and Conclusion

Many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

Some embodiments have been described in connection with the accompanying drawings. The figures are drawn to scale, but such scale should not be interpreted as limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The features in the claims are to be interpreted broadly based on the language employed in the claims, and not limited to the examples described in the present specification or during the prosecution of the application, which examples are to be construed as non-exclusive. The examples described in the specification and drawings should be considered as illustrative only. A true scope and spirit of the disclosure is indicated by the claims and their full scope of equivalents.

What is claimed is:

1. A powered unicycle comprising:
   a central wheel;
   a motor to power the central wheel;
   a control system configured to control the application of power from the motor to the central wheel;
   a body portion;
   at least one platform for supporting a user in a standing position;
   a handle that extends upwardly from the body portion to a position such that the handle can be grasped by the user of the unicycle; and
   a first outrigger wheel and a second outrigger wheel;
   wherein the unicycle is configured such that, during riding, the central wheel and the first and second outrigger wheels contact the ground and an axis of rotation of the first outrigger wheel and an axis of rotation of the second outrigger wheel are positioned between a front edge and a rear edge of the at least one platform;
   wherein the at least one platform comprises two platforms upon which the user can stand, a first of the two platforms being positioned on a first axial side of the central wheel and a second of the two platforms being positioned on a second axial side of the central wheel; and
   wherein a portion of each of the first and second platforms can pivot relative to the body, the pivoting portion being positioned outboard of a respective one of the first and second outrigger wheels.

2. The powered unicycle of claim 1, wherein the handle is at least partially retractable into the body of the unicycle.

3. The powered unicycle of claim 1, wherein the first outrigger wheel is positioned on the first axial side of the central wheel and the second outrigger wheel is positioned on the second axial side of the central wheel.

4. The powered unicycle of claim 3, wherein the first and second outrigger wheels are centered with respect to the central wheel in a fore-aft direction of the unicycle, along which the unicycle is configured to travel.

5. The powered unicycle of claim 4, wherein each of the first and second outrigger wheels is coupled to one of the platforms.

6. The powered unicycle of claim 3, further comprising a suspension element or arrangement positioned between the body and each of the first and second outrigger wheels.

7. The powered unicycle of claim 6, wherein the suspension element is positioned between a swingarm for each of the first and second outrigger wheels and the at least one platform.

8. The powered unicycle of claim 3, wherein mounts for the first and second outrigger wheels are integrated or unitary with the first and second platforms.

9. The powered unicycle of claim 3, wherein a position of the first and second outrigger wheels can be adjusted.

10. The powered unicycle of claim 9, wherein a lateral position of the first and second outrigger wheels is adjustable.

11. The powered unicycle of claim 10, wherein a first outrigger wheel assembly comprises the first outrigger wheel and a second outrigger wheel assembly comprises the second outrigger wheel, wherein the first platform and the first outrigger wheel assembly and the second platform and the second outrigger wheel assembly comprise a respective flange and slot arrangement, which allows the lateral position of the first and second outrigger wheels to be adjusted between at least two available positions.

12. A powered unicycle comprising:
a central wheel;
a motor to power the central wheel;
a control system configured to control the application of power from the motor to the central wheel;
a body portion;
a first platform and a second platform for supporting a user in a standing position;
a handle that extends upwardly from the body portion to a position such that the handle can be grasped by the user of the unicycle;
a first outrigger wheel spaced laterally away from the central wheel; and
a second outrigger wheel spaced laterally away from the central wheel;
wherein a lowermost point of the first and second outrigger wheels is aligned with a lowermost point of the central wheel; and
wherein at least a portion of the first and second platforms can pivot relative to the body, each pivoting portion being positioned outboard of a respective one of the first and second outrigger wheels.

13. The powered unicycle of claim 12, wherein a position of the first and second outrigger wheels is adjustable.

14. The powered unicycle of claim 12, wherein the first outrigger wheel is positioned on a first axial side of the central wheel and the second outrigger wheel is positioned on a second axial side of the central wheel.

15. The powered unicycle of claim 12, wherein the first and second outrigger wheels are centered with respect to the central wheel in a fore-aft direction of the unicycle, along which the unicycle is configured to travel.

16. The powered unicycle of claim 12, further comprising a suspension element or arrangement positioned between the body and each of the first and second outrigger wheels.

17. The powered unicycle of claim 12, wherein a position of the first and second outrigger wheels can be adjusted relative to the first and second platforms.

18. A powered unicycle comprising:
a central wheel;
a motor to power the central wheel;
a control system configured to control the application of power from the motor to the central wheel;
a body portion;
a first platform and a second platform for supporting a user in a standing position;
a handle that extends upwardly from the body portion to a position such that the handle can be grasped by the user of the unicycle; and
a first outrigger wheel assembly comprising a first outrigger wheel and a second outrigger wheel assembly comprising a second outrigger wheel, the first outrigger wheel being positioned on a side of the central wheel and the second outrigger wheel being positioned on another side of the central wheel;
wherein the unicycle is configured such that, during riding, the central wheel and the first and second outrigger wheels contact the ground and an axis of rotation of the first outrigger wheel and an axis of rotation of the second outrigger wheel are positioned between a front edge and a rear edge of the at least one platform; and
wherein the first platform and the first outrigger wheel assembly and the second platform and the second outrigger wheel assembly comprise a respective flange and slot arrangement, which allows the lateral position of the first and second outrigger wheels to be adjusted between at least two available positions.

19. The powered unicycle of claim 18, wherein the first and second outrigger wheels are centered with respect to the central wheel in a fore-aft direction of the unicycle, along which the unicycle is configured to travel.

20. The powered unicycle of claim 18, further comprising a suspension element or arrangement positioned between the body and each of the first and second outrigger wheels.

21. The powered unicycle of claim 18, wherein the first and second platforms comprise the slot and the first and second outrigger wheel assemblies comprise the flange.

* * * * *